United States Patent [19]
Wright

[11] Patent Number: 5,605,624
[45] Date of Patent: Feb. 25, 1997

[54] QUICK CONNECT/DISCONNECT LIQUID FILTER

[75] Inventor: Allen B. Wright, Coventry, R.I.

[73] Assignee: AlliedSignal Inc, Morristown, N.J.

[21] Appl. No.: 150,334

[22] Filed: Nov. 9, 1993

Related U.S. Application Data

[63] Continuation of Ser. No. 49,054, Apr. 19, 1993, abandoned, which is a continuation of Ser. No. 823,939, Jan. 22, 1992, abandoned.

[51] Int. Cl.⁶ .................................................. B01D 27/08
[52] U.S. Cl. .......................... 210/232; 210/440; 210/450; 210/453
[58] Field of Search .................... 210/168, 232, 210/435, 437, 440–444, 450, 452–454, DIG. 17

[56] References Cited

U.S. PATENT DOCUMENTS

| | | | |
|---|---|---|---|
| 3,502,221 | 3/1970 | Butterfield | 210/444 |
| 3,616,933 | 11/1971 | Baldwin | 210/DIG. 17 |
| 4,371,439 | 2/1983 | Thornton | 210/232 |
| 4,992,166 | 2/1991 | Lowsky et al. | 210/443 |
| 5,017,285 | 5/1991 | Janik et al. | 210/440 |
| 5,203,994 | 4/1993 | Janik | 210/438 |

FOREIGN PATENT DOCUMENTS

| | | | |
|---|---|---|---|
| 257891 | 8/1963 | Australia | 210/444 |
| 0210363 | 2/1987 | European Pat. Off. . | |
| 0231862 | 8/1987 | European Pat. Off. . | |
| 0318079 | 5/1989 | European Pat. Off. . | |
| 2130912 | 6/1984 | United Kingdom . | |

*Primary Examiner*—Matthew O. Savage
*Attorney, Agent, or Firm*—Leo H. McCormick, Jr.

[57] ABSTRACT

A filter assembly includes a base and a filter cartridge supported on the base. The filter cartridge includes a filter element mounted within a cup-shaped housing having a circumferentially extending wall and an open end. In the preferred embodiment, a collar circumscribes the housing and includes a set of cooperating bayonet lugs which cooperates with a corresponding set of bayonet lugs on the base, permitting easy removal of the filter when the filter is changed by merely rotating the collar one quarter of a turn. In the alternate embodiment, the lugs are included within the housing itself and cooperate directly with lugs on the base.

4 Claims, 2 Drawing Sheets

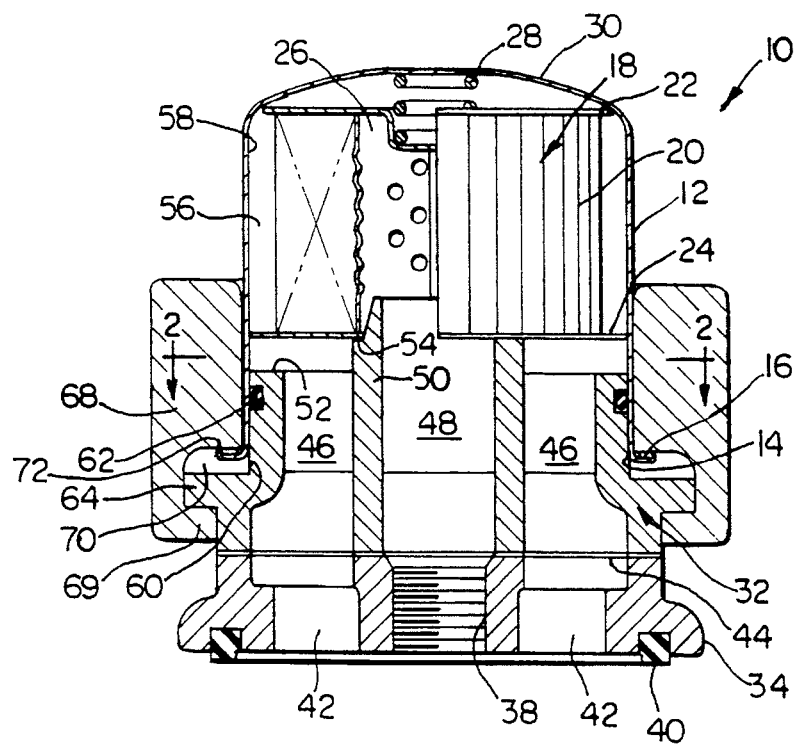
FIG. 1
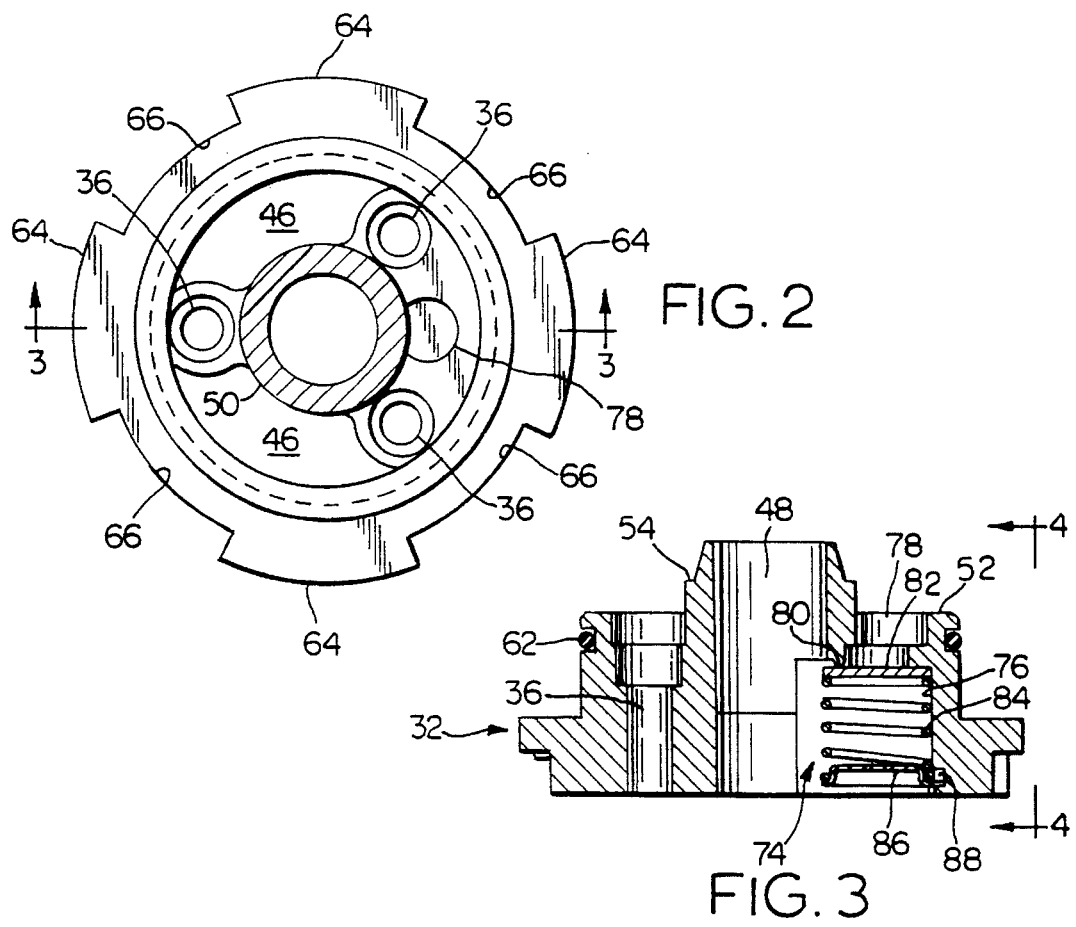
FIG. 2
FIG. 3

5,605,624

QUICK CONNECT/DISCONNECT LIQUID FILTER

This is a Continuation of abandoned application Ser. No. 08/049,054 filed Apr. 19, 1993, which is a continuation of abandoned application Ser. No. 07/823,939 filed Jan. 22, 1992.

This invention relates to a liquid filter.

Existing liquid filters used for filtering, for example, the lubricating oil of an automotive vehicle, are usually of the so-called "spin-on" type in which the filter housing is provided with a threaded outlet opening which is engaged with a mounting stud extending from a mounting surface of the vehicle engine. The filter housing also carries a gasket which circumscribes the threaded opening and which is tightened against the mounting surface on the engine to provide a seal which prevents leakage of the lubricating oil. Such filters commonly include a relief valve, which opens to permit the lubricating oil to bypass around the filtering element when the pressure differential across the filter element becomes too high. Of course, the relief valve is then thrown away with the filter when the oil filter is changed.

The present invention provides a mounting base which can either be installed as a component of the engine when the engine is manufactured or spun on to the existing oil filter mounting surface on existing engines. The base supports a filter assembly which is held in place by a quick connect/disconnect quarter turn bayonet connection. The necessary relief valve if required is installed into the mounting base and, accordingly, is not discarded every time that the filter element is changed. The filter element may be easily separated from the housing and disposed of in an environmentally safe manner. Existing filters are normally discarded, and are very difficult to recycle since it is difficult to separate the paper filter element, the liquid oil remaining in the filter, and the metal housing. Furthermore, the housing itself may be made to be either reused or thrown away. Even if the housing itself is thrown away, the heavy steel tapping plate necessary in spin-on filters is eliminated. Furthermore, a simple O-ring pressure seal is effected between the base and the housing, instead of the lock-seam seal used between the tapping plate and the housing on spin-on filters, so that a more positive seal is attained which may permit higher oil pressures to be maintained. Furthermore, the quick connect/ disconnect mechanism allows faster changing of the filter than the existing spin-on filters.

These and other advantages of the present invention will become apparent from the following description, with reference to the accompanying drawings, in which:

FIG. 1 is a longitudinal cross-sectional view of a filter base and removable cartridge assembly made pursuant to the teachings of the present invention;

FIG. 2 is a view of the filter base taken substantially along lines 2—2 of FIG. 1;

FIG. 3 is a cross-sectional view of the mounting base, omitting the removable adapter, and which is taken substantially along lines 3—3 of FIG. 2;

Figure 4:
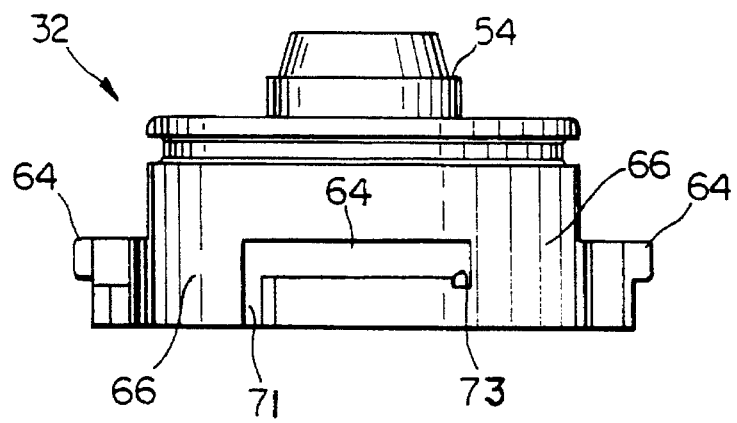
FIG. 4 is a side elevational view taken substantially along lines 4—4 of FIG. 3.

Referring now to the drawings, a filter assembly generally indicated by the numeral 10 includes a housing 12 consisting of cup-shaped portion terminating in an opened end 14 circumscribed by a radially outwardly projecting flange 16. A filter element generally indicated by the numeral 18 is received within the housing 12 through the open end 14 and consists of a substantially conventional circumferentially extending array of pleated paper 20, the upper and lower edges of which are sealed by closed end caps 22, 24 and an open end cap. A perforated metallic centertube 26 having a closed upper end (viewing FIG. 1) extends between the end caps 22, 24 and is circumscribed by the array 20 and resists radially inward collapse of the pleats. A spring 28 is disposed between the closed end of the end cap 22 and the dome shaped end 30 of the housing 12 and yieldably urges the filter element 18 toward the open end 16 of the housing 12.

The filter element 18 and the housing 12 comprise a filter cartridge which is mounted on a filter base generally indicated by the numeral 32. An adapter 34 is secured to one end of the base 32 by bolts (not shown) received in registering apertures 36 in the base 32 and the adapter 34. Adapter 34 is provided with a threaded opening 38 which may be "spun-on" a threaded mounting boss (not shown) which extends from the filter mounting surface of a conventional internal combustion engine (not shown). A circumferentially extending gasket or O-ring seal 40 circumscribes the threaded opening 38. Conventionally, the base 32 and adapter 34 are spun onto the aforementioned mounting stud until the gasket 40 is brought into sealing engagement with the mounting surface. According to the invention, the base 32 and adapter 34 are only mounted on the engine once, and the filter cartridge may be changed periodically without removal of the base 32 from the engine. Of course, the mounting filter base 32 may be permanently installed on the engine when the engine is manufactured, in which case the adapter 34 is not required.

A gasket or O-ring seal 44 is clamped between the adapter 34 and base 32 when the latter are assembled by installing bolts in the apertures 36. Gasket or O-ring seal 44 has appropriate openings which register with a pair of inlet openings 42 to permit communication from the inlet openings 42 through the gasket into inlet passages 46 in base 32. Similarly, communication is permitted from outlet passage 48 which is defined in a boss 50 carried by base 32 through the gasket 44 and into the threaded opening 38. The boss 50 projects axially from the upper surface 52 of base 32 and defines a circumferentially extending support surface 54, against which the filter element 18 is urged by the spring 28 when the filter cartridge is installed upon the base. Lubricating oil is communicated through inlet openings 42 and the inlet passages 46 across the surface 52 and into an inlet chamber 56 defined between circumferentially extending wall 58 of the housing 12 and the outer tips of the pleats comprising the array 20. Liquid is then filtered through the array 20 and is received within the outlet chamber defined within the centertube 26. Liquid then communicates through the outlet passage 48 and threaded opening 38 back into the engine.

The base 32 defines a circumferentially extending surface 60 which is received in the open end 14 of the housing 12 and which slidably engages the circumferentially extending wall 58. A circumferentially extending O-ring seal 62 is carried by the circumferentially extending surface 60 and sealingly engages the circumferentially extending wall 58. Circumferentially spaced, radially projecting bayonet lugs 64 project outwardly from the surface 60 and are separated by recesses 66. A collar 68 circumscribes the housing 12 and carries radially inwardly projecting, circumferentially extending bayonet lugs 69. The bayonet lugs 69 cooperate with the body of the collar to define a cavity 70 therebetween having a shoulder 72 which engages the flange 16. Accordingly, when a new cartridge is to be installed on the base 32, the collar 68 is slipped over the housing 12 until the shoulder 72 is engaged with the flange 16. The bayonet lugs 69 are then introduced into the recesses 66, and the collar 68 is then rotated one quarter turn to engage the lugs 69 with the lugs 64. Axially extending portion 71 of the lugs 64 acts as a stop against which the lugs 69 engage when the collar is rotated to the fully engaged position. Axially extending detent 73 locks against the opposite end of the lugs 69 from the end engaging the portion 71, and acts as a safety catch to force the serviceman to move the collar 68 a small distance axially before it is rotated counterclockwise to disengage the lugs 69 from the lugs 64, again permitting the lugs 69 to be removed through the recesses 66. The spring 28 then urges the housing 12 away from the base 32, permitting whatever pressure exists within the housing to leak past the seal 62 before the housing is finally removed from the base. The housing 12 may either be permanent or discardable each time the filter is changed. If the housing 12 is permanent, the element 18 can be easily removed from the housing and disposed of and a new element installed within the housing 12 before the latter is reinstalled on the base 32.

Conventional spin-on filter elements many times include a relief valve within the housing that is discarded each time the filter is changed. This relief valve opens to permit flow directly from the inlet to the outlet, bypassing the filter element, to thereby prevent engine damage in the event of a clogged filter. According to the present invention, a permanent relief valve generally indicated by the numeral 74 is provided in the base 32 when required. According to the invention, a bore 76 is provided in the base 32 that communicates with the inlet chamber 56 through an aperture 78 in the surface 52. A valve seat 80 circumscribes lower portion of the bore 76. A valve member 82 is urged against the valve seat 80 by a spring 84 which bears against a retainer 86 which is snapped into a recess 88 on the wall of the bore 76. The spring 84 is sufficiently strong that the valve member 82 normally is sealingly engaged with the valve seat 80 when the filter is used, so that the lubricating oil communicated into inlet chamber 56 communicates through the filter element 18 and out through the outlet passage 48. However, when the pressure differential between the passage 48 and the inlet chamber 56 attains a predetermined level, the valve element 82 opens, thereby communicating lubricating oil directly from the inlet chamber 56 into the outlet passage 48, which shares an open wall with the bore 76. Accordingly, lubricating oil bypasses the filter element 18, and passes directly from inlet chamber 56 to outlet passage 48.

Figure 5:
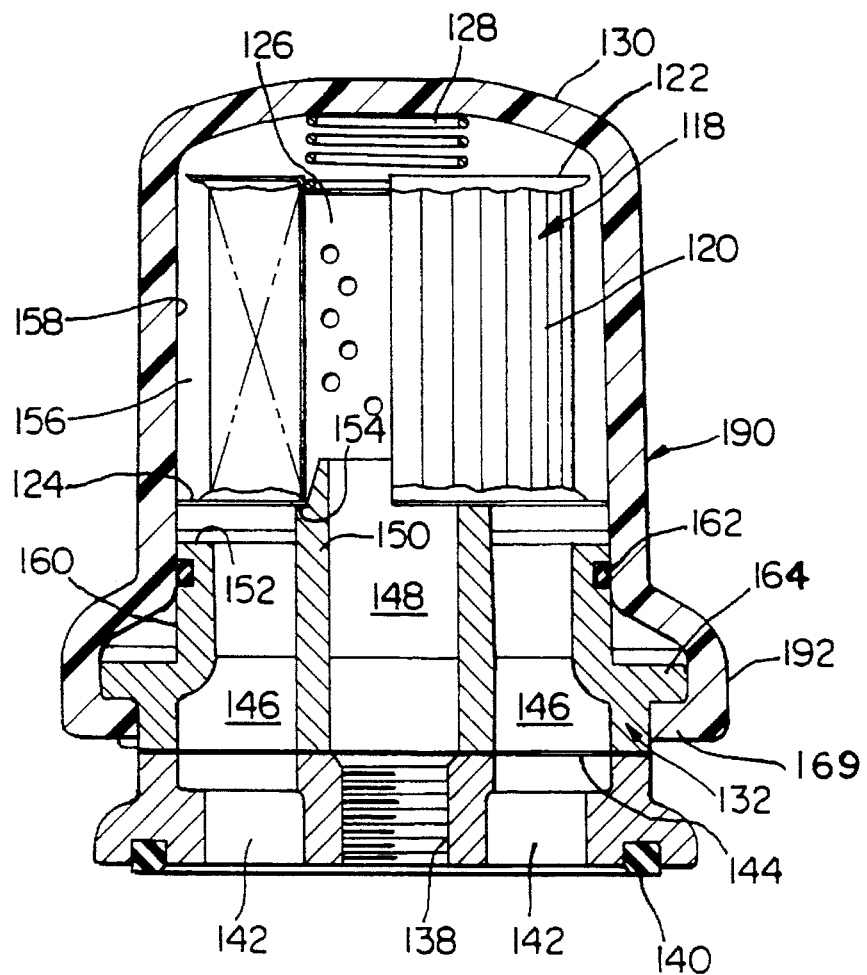
FIG. 5 is a view similar to FIG. 1 but illustrating an alternate embodiment of the present invention.

Referring now to the alternate embodiment of FIG. 5, elements substantially the same as those in the preferred embodiment retain the same reference numerals, but are increase by 100. In the embodiment of FIG. 5, the housing 12 and collar 68 are incorporated within as a single housing member generally indicated by the numeral 190. The bayonet lugs 69 on the collar 68 of the preferred embodiment are incorporated as at 169 in radial outwardly extending portion 192 of the housing 190. The lugs 169 are engaged with the lugs 164 of the base 132 in exactly the same manner as the lugs of the collar 68 are engaged with the lugs 64 of the base 32 of the preferred embodiment. Similarly, the housing 190 defines a circumferentially extending wall 158 which sealingly engages seal 162 carried in circumferentially extending surface 160 of the base 132.

I claim:

1. Filter assembly comprising a base and a filter cartridge for installation on said base, said filter cartridge including a filter element mounted within a cupshaped housing having a circumferentially extending wall and axially opposing open and closed ends, said housing including a radially outwardly extending flange at said open end, said element being installed in said housing through said open end, said base having an axially projecting portion slidably received within said open end of the housing, said axially projecting portion including a circumferentially extending surface slidably engaging an interior surface of the circumferentially extending wall of said housing when the cartridge is installed on the base to define a chamber between said base and said housing, said circumferentially extending surface having a radial groove therein for locating a circumferentially extending seal which sealingly engages said circumferentially extending wall to seal said chamber from the environment, an element engaging surface defined on said projecting portion for sealingly engaging said element, said base including a set of outwardly projecting bayonet lugs projecting radially outwardly from said base and perpendicular to said circumferentially extending surface, wherein said radial groove and said seal is located axially between said element and said outwardly projecting bayonet lugs, each of said outwardly projecting bayonet lugs having opposed ends and defining recesses therebetween, each said outwardly projecting bayonet lug including an engagement surface facing in a direction axially away from said axially projecting portion, a collar slidably engaging an exterior surface of the circumferentially extending wall of said housing to maintain said sealing engagement between said seal and wall, a portion of said collar cooperating with the housing to define a cavity therebetween and including a shoulder for engaging said flange, said collar including radially inwardly projecting bayonet lugs projecting into said cavity, each of the inwardly projecting lugs having opposed ends and defining recesses therebetween, each said inwardly projecting bayonet lug including an engagement surface facing axially toward said cavity, said recesses defined by said outwardly projecting lugs being sized to accept said inwardly projecting lugs and the recesses defined by said inwardly projecting lugs being sized to accept the outwardly projecting lugs, whereby the collar may be rotated to a fully engaged position after the inwardly projecting lugs have been inserted through the recesses defined between the outwardly projection lugs such that the engagement surfaces of the inwardly projecting lugs engage the engagement surfaces of the outwardly projecting lugs, and a spring between the closed end of said housing and said element for yieldably urging said element into sealing engagement with said element engaging surface.

2. The filter assembly as recited in claim 1, wherein each outwardly projecting lug includes an axially extending portion contiguous with the engagement surface at one end thereof and extending in a direction axially away from said projecting portion for acting as a stop against one end of the respective inwardly projecting lug when the collar is rotated to a fully engaged position, and wherein each outwardly projecting lug includes an axially extending detent contiguous with the engagement surface at the other end thereof and extending in a direction axially away from said projecting portion for engaging the other end of the respective inwardly projecting lug when the collar is rotated to a fully engaged position, and wherein said spring permits said collar to axially move in a direction away from said projecting portion to permit the inwardly projecting bayonet lugs to be disengaged from the axially extending detent on each of said outwardly projecting bayonet lugs.

3. The filter assembly as recited in claim 1 wherein said element is a circumferentially extending array of filtering media, said element engaging surface extending transversely with respect to said array and said spring acting on said array to establish sealing with respect to said sealing surface.

4. Filter assembly as claimed in claim 3, wherein said filter element includes a circumferentially extending array of pleated filter paper, said array having opposite ends, said ends being sealed by a pair of end caps.

* * * * *